Patented Nov. 17, 1931

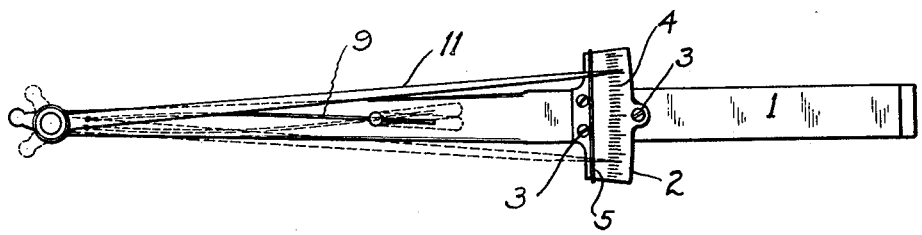
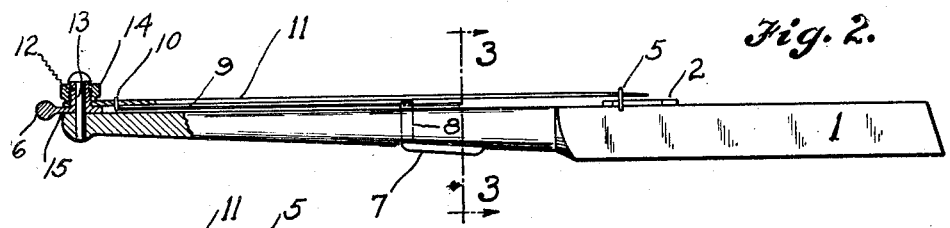
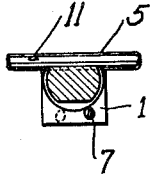
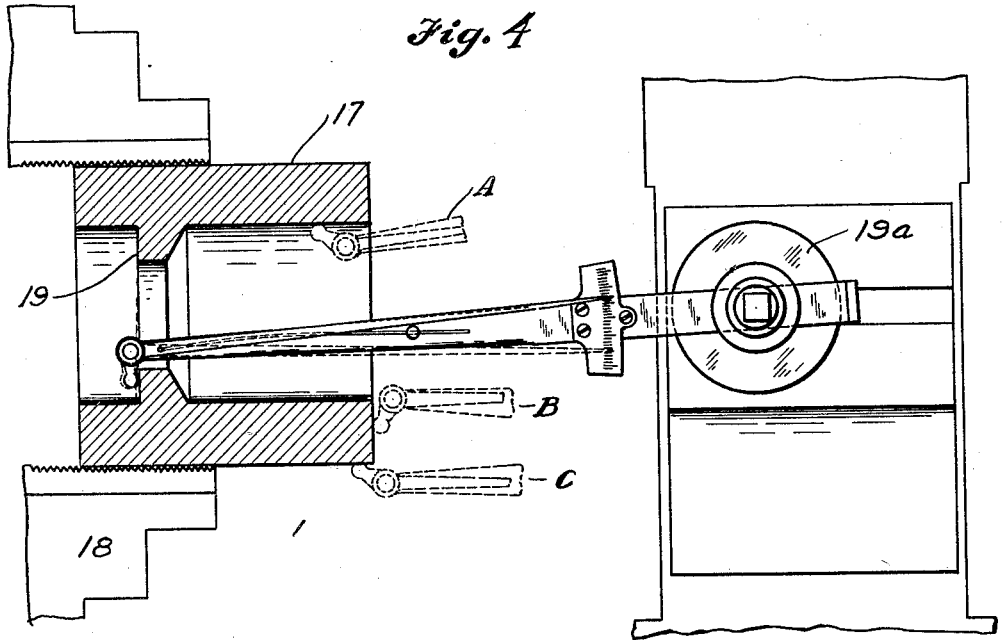

1,832,511

UNITED STATES PATENT OFFICE

HERMAN A. SETTEM, OF SEATTLE, WASHINGTON

MACHINE TOOL

Application filed May 2, 1929. Serial No. 359,849.

This invention relates to improvements in machine tools or appliances and more particularly to such devices as involve measuring or registering elements which are actuated by physical contact of a part of the device with the work, such as the correct facing of a hollow piece of work as a collar, valve seat or the like, either upon its rearward side or its forward side; or the correct cutting of the interior wall of such a member. In other words, my device greatly facilitates the exact centering of the work in a lathe, or the like, and includes means for visually showing when the work has been correctly centered.

The object of the invention is to provide a tool which may be used to accurately center a piece of work in a lathe by bearing against a face of the work during rotation of the chuck.

A further object of the invention is to provide a tool which will have a minimum of moving parts and which can be easily applied to the work.

The invention is illustrated in the accompanying drawings, in which:

Figure 1 is a top plan view of the device.

Figure 2 is a side elevation partly in section.

Figure 3 is a cross sectional view on the line 3—3 of Figure 2.

Figure 4 is a longitudinal sectional view of an ordinary chuck with a piece of hollow work in position therein showing the tool in working position.

Referring now more particularly to the drawings, reference numeral 1 indicates the body of the instrument upon which is mounted a plate 2 secured in place by means of screws 3. The plate has graduations upon it, as shown at 4. The plate has affixed to it a wire 5 secured to the under side of the plate and spaced away therefrom (Figure 3). Passed through a suitable aperture about midway of the body 1 is a member 7 which is bent up at right angles as shown, the upwardly bent portion rotating within the said aperture and being bored through at its upper terminal so that a spring wire 9 may be passed through the bore, the left hand end of the said wire being upturned, as at 10, and passed through an aperture in a narrow blade 11.

The blade 11 is pivoted upon a shank 12 centrally bored at 13 and has external threads which coact with the internal threads of the knurled nut 14. Confined between the blade 11 and the end of the body 1 is a plate 15 having a gauging extension 16. The opposite end of the blade 11 passes beneath the wire 5 and is tapered toward that end as plainly shown in Figure 1. The right hand end of the member 7 extends over upon and wipes around the arc represented by the central portion of the body 1 (Figure 3) so that by pressing upon the free end of the member 7, the vertical portion of the same will be rotated with respect to the body 1 correspondingly thereby making a zero adjustment of the indicating blade possible. By rotating the lever 7, the blade may be positioned at a zero point on the arc. To make a zero adjustment, the nut 14 is loosened, the plate 15 rotated to the position desired, depending upon the relation of the face to be engaged by the extension 16 and the tool, and the member 7 rotated to bring enough tension on the spring 9 to keep the pointer in close relation to the scale.

Assuming that the hollow piece of work indicated at 17 is positioned within the jaws of an ordinary chuck 18 in the usual manner and it is desired to correctly backface the surface 19. To do this, the right hand end of the body 1 is passed through the usual post 19ª in the lathe (Figure 4), the operator having first rotated the gauging member 16 from its position as seen in full lines in Figure 1 to either of its dotted positions, as seen in that figure or as seen in Figure 4. The operator now turns the chuck rather slowly by hand, meanwhile observing the action of the free end of the blade 11 with respect to the graduations 4. If the work is not centered with respect to the latter, the behavior of the blade or pointer 11 will instantly and accurately show this and the degree of inaccuracy will be multiplied of course, as is obvious, so as to make the readings very plain. For example, if during the slow turning or two of the chuck, it is seen that the work is not centered, one of the usual screws and chuck jaws will be either loosened or tightened as required, the turning of the chuck by hand slowly proceeding so that very quickly the free end of the pointer 11 will show that the work is exactly centered. In other words, as soon as a continued turning of the chuck does not deflect the end of the pointer from the centermost graduation, then it is certain that the work is truly centered and the backfacing operation described can be proceeded with in the usual manner.

This is an illustration of but one of the uses of my improved machine. If it is desired to center the work so that the interior wall of a bore in a hollow member may be accurately done, the left hand end of the tool (Figure 4) is moved to its dotted position indicated at A, which will be followed by the same accuracy as with the backfacing just described. If it is desired to face off the front portion of the member 17, the tool is moved to its dotted position, as indicated at B. If it is desired to accurately finish the perimeter or outside surface of the work 17, the tool is passed to its position, as indicated at C, and so on with great variety of application of the device to the work. It will be noted that the needle or blade 11 is, in reality, in two parts, the gauging member 16 rotating with the needle or blade whenever the knurled nut 14 is turned sufficiently to cause the gauging member 16 and the blade 11 to be sufficiently frictioned.

What is claimed to be new is:

A centering tool comprising an elongated body, a pivot pin carried at one end of the body, a plate having an upstanding threaded portion rotatively mounted on said pin, a gauging member projecting from said plate, an indicating blade formed with an opening at one end to engage the threaded portion, said blade being formed with a pointer at the other end, an indicating scale carried by said body and coacting with said blade, and a nut threaded on said upstanding portion adapted to bring the blade and plate into frictional engagement.

In testimony whereof I affix my signature.

HERMAN A. SETTEM.